(12) United States Patent
Buchkremer

(10) Patent No.: US 9,096,073 B2
(45) Date of Patent: Aug. 4, 2015

(54) DEVICE AND METHOD FOR PRINTING, IN PARTICULAR FOR PRINTING CONTAINERS IN SEVERAL COLORS

(75) Inventor: Wolfgang Buchkremer, Grevenbroich (DE)

(73) Assignee: KHS GmbH, Dortmund (DE)

( * ) Notice: Subject to any disclaimer, the term of this patent is extended or adjusted under 35 U.S.C. 154(b) by 14 days.

(21) Appl. No.: 13/698,127

(22) PCT Filed: Apr. 8, 2011

(86) PCT No.: PCT/EP2011/001754
§ 371 (c)(1),
(2), (4) Date: Nov. 15, 2012

(87) PCT Pub. No.: WO2011/144278
PCT Pub. Date: Nov. 24, 2011

(65) Prior Publication Data
US 2013/0063505 A1    Mar. 14, 2013

(30) Foreign Application Priority Data
May 19, 2010  (DE) .......................... 10 2010 020 958

(51) Int. Cl.
*B41J 3/407*    (2006.01)
*B41J 23/32*    (2006.01)
(52) U.S. Cl.
CPC ..................... *B41J 3/4073* (2013.01)
(58) Field of Classification Search
CPC ................. B41J 3/4073; B41J 3/407

USPC ........................................................ 310/12.09
See application file for complete search history.

(56) References Cited

U.S. PATENT DOCUMENTS

| 4,967,207 | A  | * | 10/1990 | Ruder ................................ 347/7 |
|-----------|----|---|---------|----------------------------------------------|
| 6,467,887 | B2 | * | 10/2002 | Lopez et al. ...................... 347/68 |
| 7,859,139 | B2 | * | 12/2010 | Jacobs ........................ 310/12.09 |
| 2001/0045526 | A1 | * | 11/2001 | Itoh et al. ................... 250/492.2 |
| 2002/0021313 | A1 | * | 2/2002 | Ninomiya .......................... 347/8 |
| 2003/0230941 | A1 | * | 12/2003 | Jacobs ............................ 310/12 |
| 2004/0011227 | A1 | * | 1/2004 | Shadrach, III ................. 101/35 |
| 2006/0023023 | A1 | * | 2/2006 | Mattern ........................... 347/37 |
| 2006/0144261 | A1 | * | 7/2006 | Uptergrove .................... 101/35 |
| 2006/0250464 | A1 | * | 11/2006 | Sheinman ..................... 347/101 |
| 2009/0195570 | A1 | * | 8/2009 | Hayashi ........................... 347/5 |

FOREIGN PATENT DOCUMENTS

| DE | 102007036752 | 2/2009 |
|----|--------------|--------|
| DE | 102007050493 | 4/2009 |
| EP | 0707959 | 4/1996 |
| WO | 2009/018892 | 2/2009 |

\* cited by examiner

*Primary Examiner* — Shelby Fidler
(74) *Attorney, Agent, or Firm* — Occhiuti & Rohlicek LLP

(57) ABSTRACT

An apparatus for printing containers in several colors on an outer container surface with an imprint formed by a print image includes printing head units, a pair of transport systems for moving the head units along a first direction on a closed path, container receptacles, a second transport system moving the receptacles between a feed and a discharge. The transport systems form a printing section between the feed and discharge. One of the transport systems causes controlled and independent motion of the printing head units or receptacles along a motion path thereof.

20 Claims, 6 Drawing Sheets

DEVICE AND METHOD FOR PRINTING, IN PARTICULAR FOR PRINTING CONTAINERS IN SEVERAL COLORS

CROSS REFERENCE TO RELATED APPLICATION

This application is the national phase under 35 USC 371 of international application no. PCT/EP2011/001754, filed Apr. 8, 2011, which claims the benefit of the priority date of German application no. 10 2010 020 985.9, filed May 19, 2010. The contents of the aforementioned applications are incorporated herein in their entirety.

FIELD OF DISCLOSURE

The invention relates to a device for printing containers in several colors on an outer container surface with an imprint formed by a print image.

BACKGROUND

Containers within the meaning of the invention, in particular, are packaging means designed as containers for filling material of different types and especially bottles or bottle-like containers or cans or can-like containers. Printing colours or printing inks within the meaning of the invention are those colours or inks, especially in liquid or slightly viscous form, which can be processed with printing heads which preferably can be digitally selected and operate according to the ink-jet printing head principle.

Printing heads within this meaning, in particular, are printing heads having a plurality of printing nozzles or printing apertures for applying the printing colour or printing ink, for example in at least one row, and which can be electrically selected individually for applying the printing colour or printing ink and, for this purpose, have a pressure-producing element at the respective nozzle aperture, for example taking the form of an electrode or of a piezo element.

Devices of the generic type for printing containers using printing heads operating according to the ink-jet printing principle and under relative motion between the printing heads and the respective container during printing are known (DE 10 2007 036 752). A known device of this type has two transport systems in the form of two support rings concentrically arranged to each other about a vertical machine axis and rotatably drivable about this machine axis. At the outer support ring, container receptacles are provided, distributed at uniform and preset angular distances about the vertical machine axis. At the inner support ring, also at preset angular distances, printing head units are provided each with a printing unit having several printing heads. The multicolour print images are applied to the containers, each arranged at a container receptacle, on a printing section which corresponds to the angular range of the rotary motion of the support rings between a container infeed and a container outfeed, namely in successive printing steps wherein, in each printing step, a colour set of the respective print image is produced. During the respective printing operation, the support rings and thus the printing head units and containers are moved synchronously, i.e. in the same direction and with the same angular speed. The inner support ring is additionally designed for an oscillating rotary motion, namely in the form that, following the application of a print image or of a colour set onto a container, a further container is then printed with the same printing head unit.

SUMMARY

The task of the invention is to show a device by which, with improved performance and with reduced design effort, the printing of containers with at least one high-quality imprint each formed by at least one print image is possible.

A feature of the device according to the invention is that at least one transport system is designed such that, on the printing section, the container receptacles and their respective printing head units allocated during printing are moved synchronously, i.e. in the same direction and with the same speed but, outside the transport section, the printing head units or container receptacles of this transport system can be moved with changed speed, for example with increased speed and/or in a controlled manner but independently of the remaining printing head units or container receptacles. For this purpose, the corresponding transport system is preferably designed with a linear drive that enables a motion of the printing head units or container receptacles at least on different sections of the motion path of the transport system with changed speed. Such linear drives, for example, are electromotive drives operating according to the linear motor principle which have, at a fixed fitting that forms a guide for movable carriages, in the motion direction or transport direction of the carriages, a plurality of successive magnetic poles with associated, individually selectable windings and permanent magnets at the carriages. Such a linear drive is offered by Siemens AG on the market under the "PackTrak" brand. Linear drives within the meaning of the invention, however, also include drives in which the carriages guided in a guide are moved in the transport direction by means of mechanical drive elements, for example by means of transport belts or conveyor belts, wherein the speed of the drive elements on different sections of the motion path of the carriage can be individually controlled.

The invention is based on the knowledge that, for maximum performance of the device (number of printed containers per time unit), taking into account the time required for completing the respective print image, said time, inter alia, being determined by the speed of the printing heads and by the drying time of the printing colours, a preferably close succession of container receptacles and their allocated printing head units on the printing section shall be aimed for, suitably adapting the conveying speed and the length of the printing section, that, however, a clear reduction in the number of the required printing head units and container receptacles and thus, inter alia, a clear reduction in the design effort is possible by the accelerated return of these elements from the printing section end or printing section outfeed to the printing section inlet.

By using the flexible transport system designed for independent motion of the printing head units or container receptacles, it is also possible to implement waiting positions for the printing head units or container receptacles which, for example, include waiting positions for refilling the printing head units with printing colour or printing ink, for cleaning the printing head units or the local printing heads etc.

The device according to the invention allows accurate positioning of the printing units or printing heads in relation to the respective container. In particular, it is also possible, with the device according to the invention, to completely produce the respective print image with the printing head unit allocated to the container receptacle, i.e. a changeover of printing head units while producing a print image is not required.

Further developments, advantages and possible applications of the invention also follow from the description below of execution examples and from the Figures. To this end, all features described and/or pictorially represented, for themselves or in any combination, in principle, are the subject matter of the invention, irrespective of their summary in the claims or their retrospectivity. The contents of the claims is also made part of the description.

BRIEF DESCRIPTION OF THE FIGURES

Hereinafter, the invention is explained in more detail using execution examples with reference to the Figures, showing.

DETAILED DESCRIPTION

Figure 2:
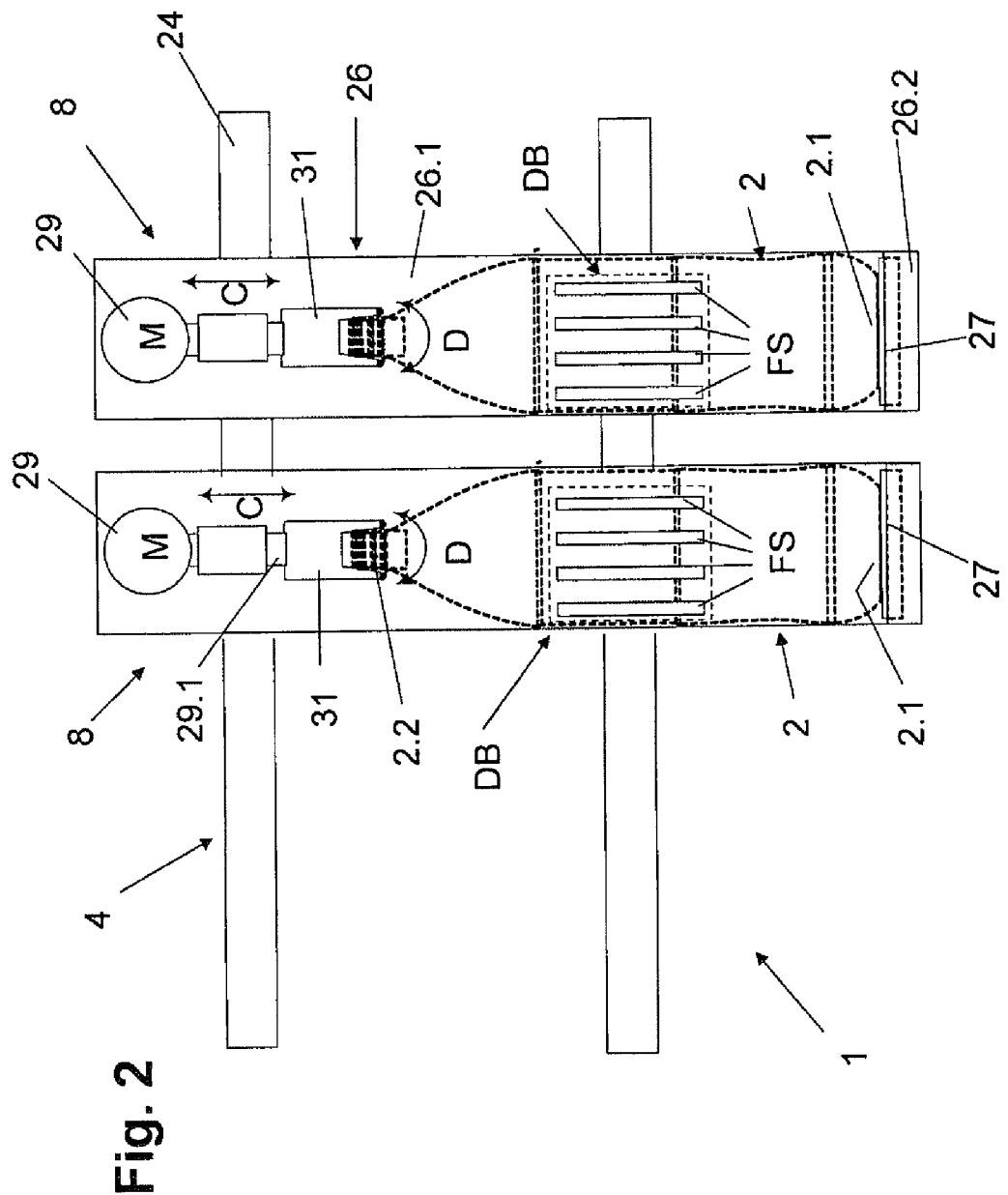
FIG. 2 in schematic representation: two container receptacles of the second transport system for the containers.

The device generally designated 1 in the Figures serves to print containers which, as an example, are represented in the form of bottles, each with at least one print image DB in the form of a multicolour print consisting of several colour sets FS of different colour choices complementing the print image, said colour sets being schematically represented in FIG. 2 in the form of several stripes which, however, in fact are several overlaid colour sets FS, e.g. for the colours Black, Yellow, Magenta and Cyan.

The device 1 has, in the embodiment shown, two transport systems, namely a first transport system 3 and a second transport system 4. The first transport system 3 includes a plurality of printing head units 5 which, individually and independently of each other but in the manner described below in more detail, can be controlledly moved in a motion direction or transport direction A on a closed motion path 6 which, in the embodiment shown, is essentially oval, namely also along a treatment section or printing section designated 7 in FIG. 1 and straight in the embodiment shown, said treatment section or printing section extending between a printing section infeed 7.1 and a printing section outfeed 7.2.

Figure 3:
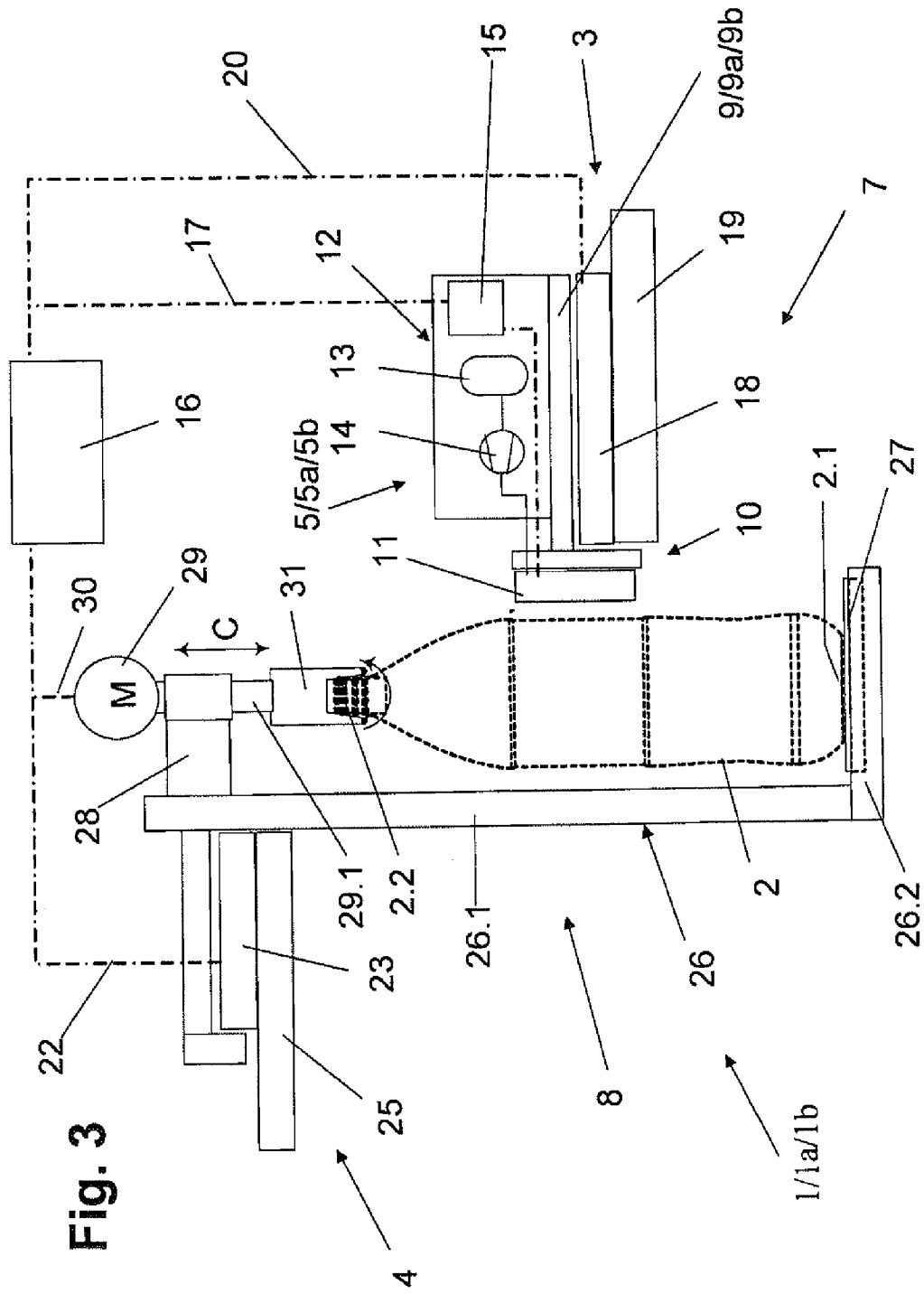
FIG. 3 in simplified representation: a vertical section through the treatment section or printing section of the device of FIG. 1.

The second transport system 4 essentially serves to transport the containers 2, which are arranged in container receptacles 8 (FIGS. 2 and 3) and with their container axes oriented in the vertical direction, through the printing section 7 in the transport direction B and in the manner more detailedly described below for controlled rotation or pivoting of the containers 2 about their vertical container axes during printing.

Figure 1:
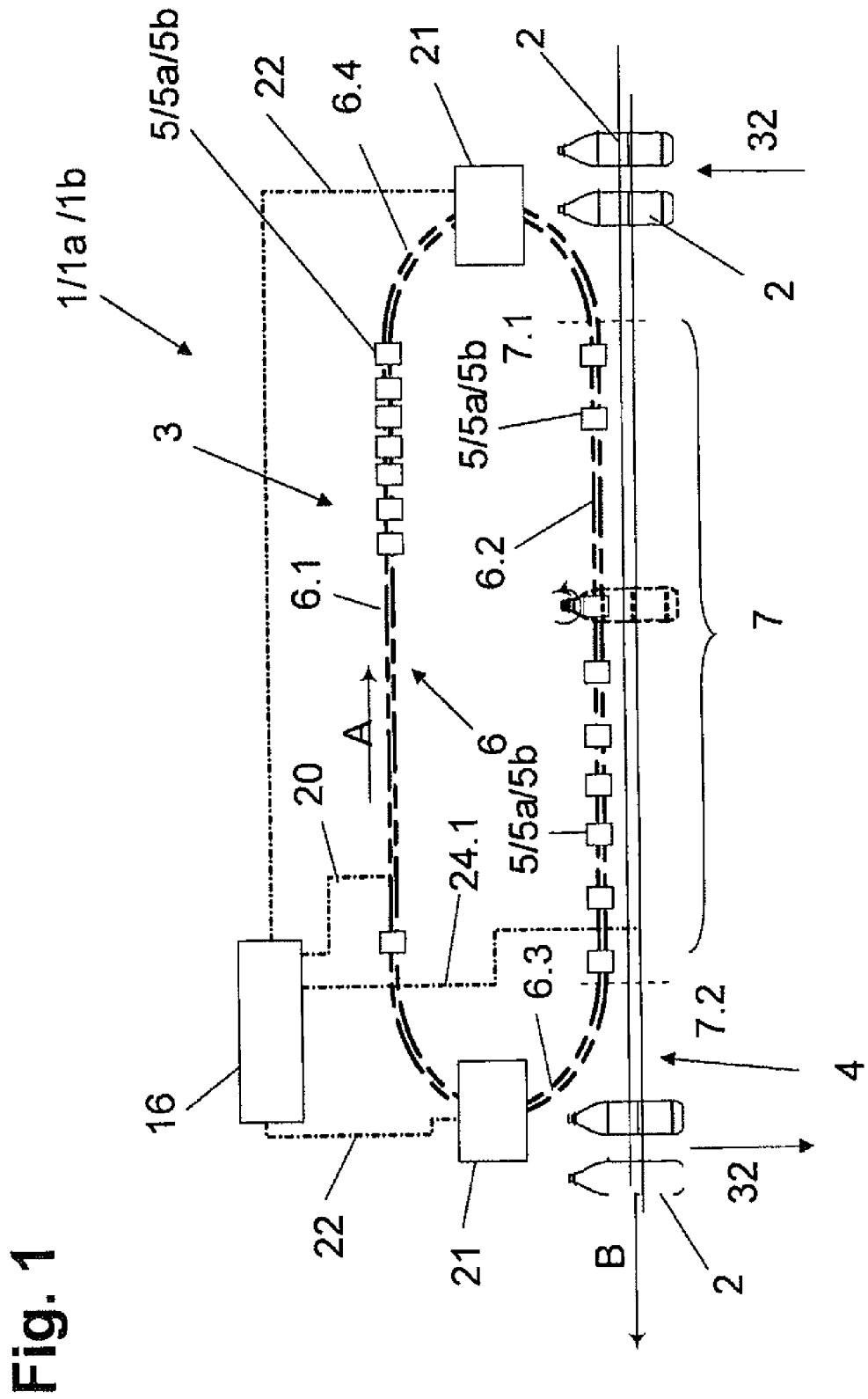
FIG. 1 in schematic representation and, essentially, in plan view: a device for printing containers each with at least one print image in a multicolour print image.

In FIG. 1, the transport system 4 is, for the sake of easier representation, only shown on a partial length in the area of the printing section 7; in fact, however, the transport system 4 is designed such that the receptacles 8 also move on a closed motion path 9, namely, in an embodiment shown, also independently of each other but controlled in the manner more detailedly described below.

The printing head units 5 each comprise a carriage 9 which, along the motion path 6, is movably guided on a carriage guide (not shown) and on which the respective printing unit 10 is arranged which, in the embodiment shown, has four successive printing heads 11 in the horizontal direction for different colours, e.g. for Yellow, Magenta, Cyan and Black for producing the different colour sets FS of a multicolour imprint.

The printing heads 11 are digitally controllable printing heads in the style of ink-jet printing heads, for example printing heads available on the market under the designation "XAAR" or "XAAR500". Essentially, the printing heads 11 each consist of a housing with a plurality of individually selectable printing nozzles or nozzle apertures for applying the printing colour or printing ink in the distribution and quantity, which correspond to the respective print image DB and colour extract FS, onto the substrate to be printed, i.e. onto the outer or peripheral surface to be printed which, for example, is circular cylinder shaped, of the containers 2. The printing nozzles, with their axes arranged horizontally or essentially horizontally, are arranged at each printing head 11 in at least one vertical row. The application of the printing colour or printing ink is achieved by an appropriate selection of electrodes or of piezo elements or actuators in the printing heads 11.

In addition, on each carriage 9, a supply unit 12 is provided which, on the one hand, has means for refilling the printing heads 11 with the respective printing colour or printing ink, for example in the form of a separate storage or auxiliary tank 13 for each printing colour or printing ink with associated pump 14 for delivering the printing colour or printing ink into the associated printing head 11. The supply and control unit 12 further comprises electronics 15 which, inter alia, serve to control the printing heads 11 or to control the application of the printing colour or printing ink in the distribution and quantity, which correspond to the respective print image DB or colour extract FS, onto the containers 2 to be printed, in which however, preferably, the respective print image DB or the printing template corresponding to this print image is also electronically stored in a memory. The reading in and/or changing of the printing templates electronically stored in the memory of the electronics 15 of the printing head units are performed by a higher, central control unit 16, if necessary also such that the printing templates of the printing head units 5 are different, providing this is desired for a different printing of the containers 2. For the transmission and/or changing of the printing templates and also for further control processes, each printing head unit 5 or its electronics 15 is or are connected, via a data transmission section 17 enabling a bidirectional transfer of data and/or commands, with the control unit 16.

For the individual yet controlled motion of the printing head units 5, the transport system 3 has a linear drive 18 extending along the motion path 6, said linear drive being held by beams 19 on a machine frame and forming the carriage guide and, in the manner known to those skilled in the art, consisting of a plurality of successive magnetic poles along the motion path with associated electric windings and permanent magnets, which are assigned to these magnetic poles, at the carriages 9 of the printing head units 5.

In the embodiment shown, the motion path 6 is designed such that it has two longer sections 6.1 and 6.2 running straight and parallel and at a distance from each other and two curved sections 6.3 and 6.4 each connecting the sections 6.1 and 6.2 with each other. Using the control unit 16, the linear drive 18 can be controlled such that very different motions result for the individual printing head units 5 at least at different sections or partial sections of the motion path 6. Thus, for example, a group of printing head units 5 on the section 6.1 is in a waiting position from which the first printing head unit 5 relative to the transport direction A is accelerated across the section 6.4 to the printing section infeed 7.1 to then, for example, move more slowly but synchronously with the motion of a container receptacle 8, in the manner described more detailedly below, along the printing section 7 for printing a container 2. After reaching the printing section outfeed 7.2, the respective printing head unit 5 is, for example, again accelerated back across the section 6.3 to the section 6.1 or to the local waiting position. The control of the linear drive 18 and thus of the motion of the printing head units 5 is performed by the control unit 16 via a data transmission section 20 enabling a bidirectional transfer of data and/or commands.

On the motion path 6, filling stations 21 are provided, namely at the sections 6.3 and 6.4 for the embodiment shown. By means of the control unit 16, the linear drive 18 further is controllable such that each printing head unit 5, when passing a filling station 21, is stopped for automatic refilling of the printing colours or printing inks. This refilling can occur automatically or on request, respectively, controlled by a signal corresponding to the respective filling level of the auxiliary tank 13 of the printing head units 5. The filling stations 21, too, are controlled by the control unit 16 by means of a data transmission section 22 enabling a bidirectional transfer of data and/or commands. The filling stations 21 are, for example, identically designed each enabling the refilling of all printing colours or printing inks, or the filling stations 21 are each designed for refilling only two printing colours.

The container receptacles 8 for example comprise a support carriage 23 which can be moved along the transport section 4 in the transport direction B, guided by a carriage guide (not shown) of a linear drive 24 also controlled by the control unit 16 via a data transmission section 24.1, said linear guide being held by beams 25 at the machine frame and, equally, being designed like the linear drive 18, i.e., for example, in turn consisting of a plurality of successive magnetic poles in the transport direction B and individually selectable magnetic windings allocated to these. Each carriage 23, in turn, is provided with at least one permanent magnet interacting with the magnetic poles of the linear drive 24.

On a longitudinal side of the carriage 23, an L-shaped support foot 26 is attached, namely, in the embodiment shown, in the area of the upper end of the longer leg 26.1, which extends in the vertical direction, of the support foot 26. The shorter, horizontal leg 26.2 is provided, on its upper side, with a turntable 27 which, in the embodiment shown, is freely rotatable about a vertical axis VA and forms a standing surface for the bottom 2.1 of the respective container 2 received in the container receptacle 8 and arranged with its axis aligned with the axis VA.

At a distance above the turntable 27, at a jib 28, a lifting and rotating drive 29 is provided which, via a data transmission section 30 enabling a bidirectional transfer of data and/or commands, is connected with the control unit 16. As regards drives, the lifting and rotating drive 29 is connected with a shaft 29.1 which, arranged aligned with the axis VA, carries a centring bell 31 at its lower end so that the centring bell 31 can, via the lifting and rotating drive 29 controlled by the control unit 16, be raised and lowered by a specified stroke in the axial direction of the axis VA (double arrow C of FIG. 2) and also controlledly pivoted about the axis VA (double arrow D of FIGS. 2 and 3).

The function of the device 1 can be described as follows:

At a container infeed generally designated 32 in FIG. 1, the containers 2 which, for example, are filled and closed, each and individually are handed over by an outer transporter (not shown) to a container receptacle 8 moving past the container infeed 32, namely with the centring bell 31 initially raised so that each container 2 with its container bottom 2.1 stands upright on the turntable 27 of the container receptacle 8 concerned. Following this, controlled by the control unit 16 and driven by the lifting and rotating drive 29, the centring bell 31 is lowered so that the respective container 2 is received, in the area of its container mouth or in the area of the local container closure 2.2, in the centring bell 31 and thus held between it and the turntable 27.

The two transport systems 3 and 4 or their linear drives 18 and 24 are controlled such that whenever a container receptacle 8 with a container 2 has reached the printing section infeed 7.1, there also is a printing head 5 which, for example, was accelerated from the section 6.1 or from the local waiting position and moved to the printing section infeed 7.1. Starting from the printing section infeed 7.1, the container receptacle 8 provided with a container 2 and the printing head unit 5 allocated to this container receptacle are moved synchronously, i.e. with the same speed and in the same transport direction A or B through the printing section 7. To this end, the printing heads 11 of the printing unit 10 of the respective printing head unit 5 are arranged, in the manner shown in FIG. 4, adjacent to the peripheral surface, to be printed, of the respective container 2, namely distributed at uniform angular distances about a partial area of the peripheral surface to be printed, which has a circular cylinder shape, of the container 2.

By selecting the printing heads 11 using the electronics 15 or using the print image stored in these electronics, there occurs the multicolour printing of the container 2, wherein the printing heads 11 apply the printing colour each in vertical rows and the two-dimensional print image DB is thus generated by controlled rotation (double arrow D) of the container about its vertical container axis or about the axis VA by the lifting and rotating drive 29 selected by the control unit 16. In principle, this provides the possibility of applying the multicolour print or the print image DB in a single printing operation in which the container 2 is pivoted about its vertical container axis only once from a starting position into an end position corresponding to the complete print image DB, or the printing operation occurs in several working steps wherein, in each working step, by pivoting (double arrow D) the container 2 from the starting position to the end position, a colour set FS each of the multicolour print or of the print image DB or a combined colour set of at least two colours is produced.

As soon as the complete print image DB is applied to the container 2 concerned, but no later than when the container receptacle 8 concerned has reached the printing section outfeed 7.2, the respective printing head unit 5 is moved independently of the motion of the container receptacle 8 across the section 6.3 and the section 6.1 into the waiting position. The container receptacle 8 with the printed container 2 is then, for example, initially accelerated to the container outfeed 33, at which the printed container 2, after lifting the centring bell 31, is removed from the container receptacle 8 and passed on to an outer transporter (not shown). The then-empty container receptacle 8 for example reaches a waiting position of the transport system 4, from which the container receptacles 8 are then again moved by the transport system 4 or by the linear conveyor 24 to the container infeed 32 for receiving a further container to be printed.

Above, it was assumed that the synchronous motion of the printing head units 5 and of the container receptacles 8 allocated to each of these occurs along the printing section 7 alone by corresponding selection of the linear drives 17 and 18. In principle, there also is the possibility that, whenever a printing head unit 5 is allocated to a container receptacle 8 at the printing section infeed 7.1, a coupling or connection is produced between the printing head unit 5 and this allocated container receptacle 8, said coupling or connection, in addition to the synchronous drive by means of the linear drives 18 and 24, ensuring accurate positioning of the respective printing head unit 5 relative to the associated container receptacle 8. This coupling can, for example, be achieved by mechanical means and/or magnetically. In particular, it is then also possible that the motion of the respective printing head unit 5 and of the associated container receptacle 8 along the printing section 7 only occurs by means of a linear drive 18 or 24, that is, for example, only the respective printing head unit 5 is moved by means of its linear drive 18 and carried along by means of associated container receptacles 8 or, vice versa, only the respective container receptacle 8 is moved by means of its linear drive 24 and the allocated printing head unit 5 is carried along by means of the mechanical connection.

At least the data transmission sections 17 and 30 are preferably designed for a wireless, bidirectional data and/or command transmission. To determine the position of the respective printing head unit 5 or of the respective container receptacle 8, encoder elements are provided at the carriage 9 or 23, for example in the form of permanent magnets which interact with sensor elements reacting to the magnetic field of these magnets, which are provided at least in critical areas of the respective motion path, for example at the printing section infeed 7.1 and/or at the printing section outlet 7.2 and/or at the refilling or filling stations 21 and/or at the parts of the motion path 6 which form the waiting location or position and/or at the container infeed 32 and/or at the container outfeed 33.

Figure 4:
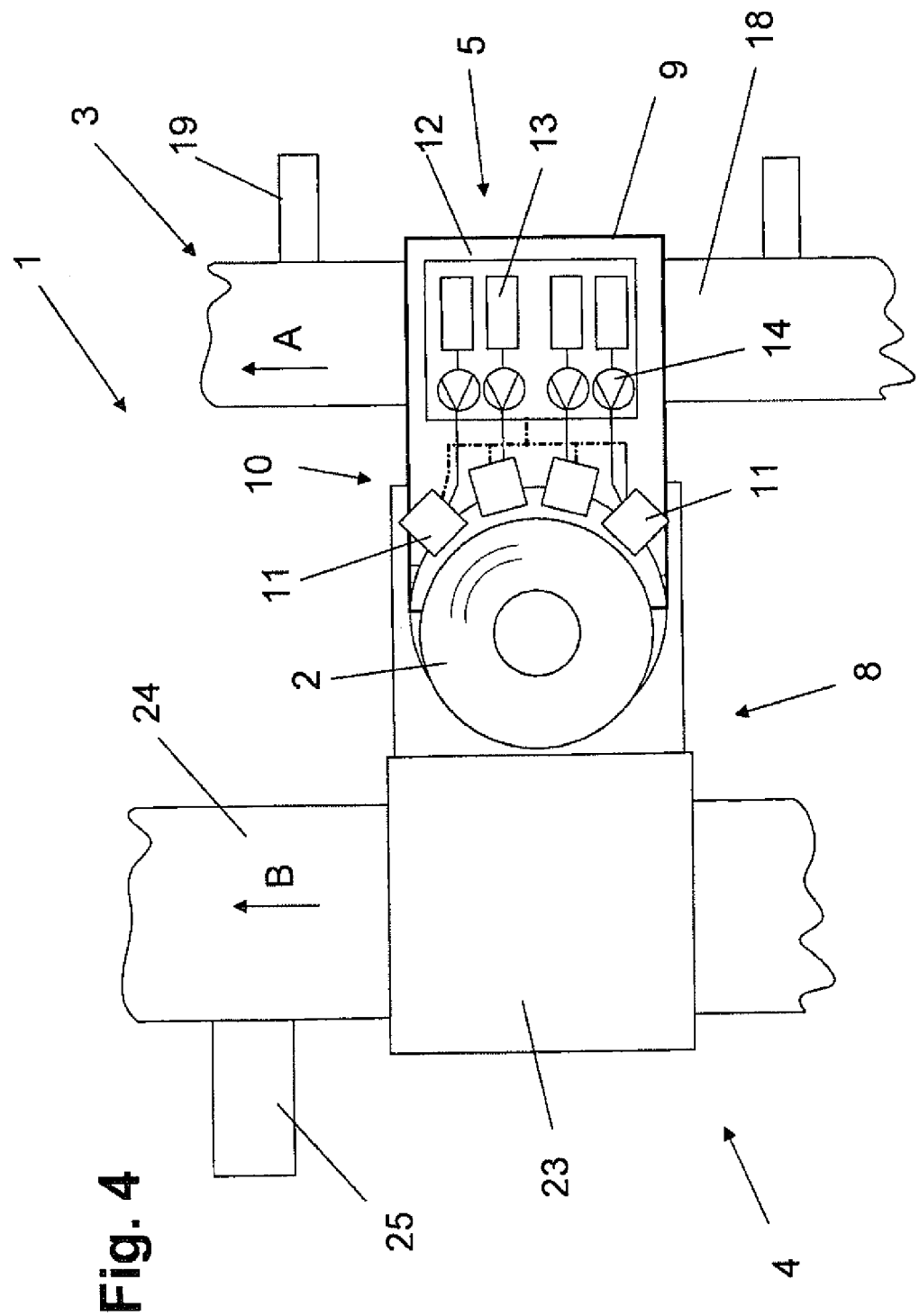
FIG. 4 a plan view of the arrangement of FIG. 3.
Figure 5:
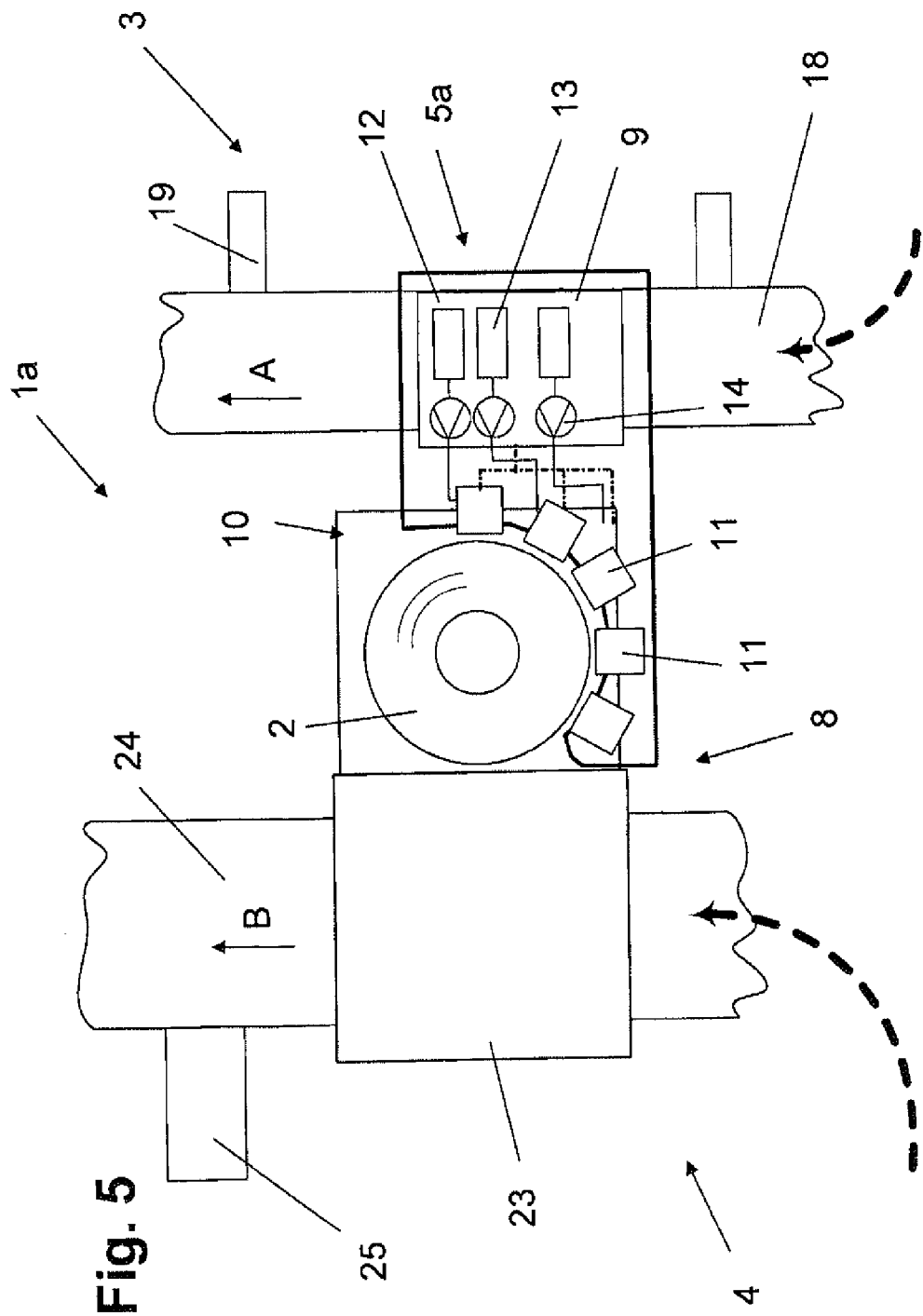
FIGS. 5 and 6: representations like FIG. 4 for two further embodiments of the printing head unit.

While, in the embodiment shown in FIGS. 1-4, the respective printing unit 10 is designed such that the printing heads 11 are in an arc-shaped arrangement on a side, of the respective carriage 9, that extends in the transport direction A and thus, on the printing section 7, on the side facing the local transport section 4 (FIG. 4), FIG. 5 shows, in a representation that corresponds to FIG. 4, i.e. in plan view, a device 1a with printing head units 5a in which the printing heads 11, which form the respective printing unit 10, are provided in an arc-shaped marginal area of the carriage 9a, this (marginal area) being oriented, at least on a partial length, perpendicular or transversal to the transport direction A of the printing head units 5a.

Figure 6:
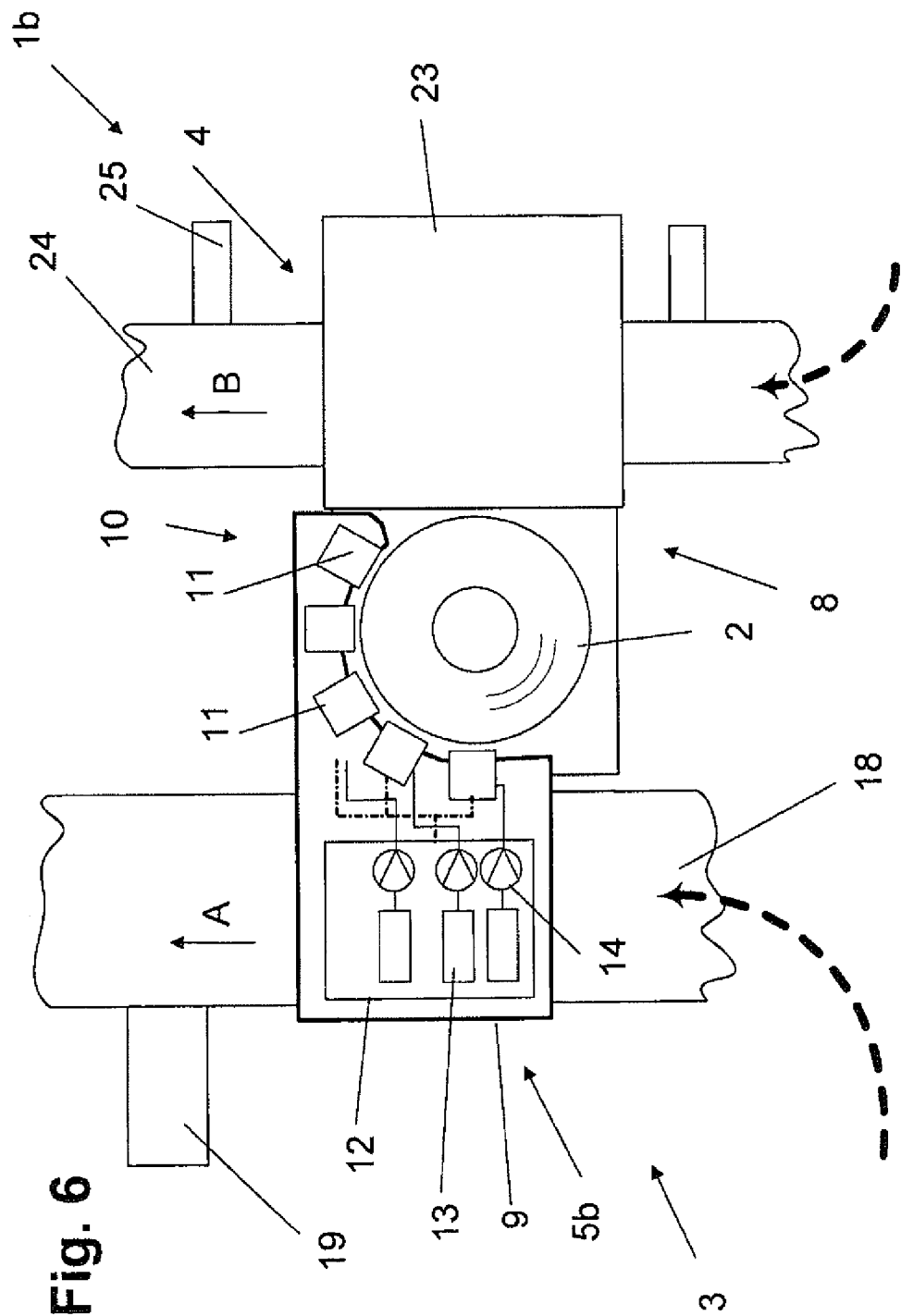

FIG. 6 shows, in a representation like FIG. 5, as a further embodiment, a printing head unit 5b of a device 1b which differs from the device 1 in that, for the printing head units 5b, the individual printing heads 11 in turn are provided in an arc-shaped marginal area of the respective carriage 9b, this (marginal area) being oriented, at least on a partial length, perpendicular or transversal to the transport direction A of the printing head units 5b, namely deviating from the printing head units 5a of FIG. 5 such that the printing heads 11 move ahead of the associated container 2 relative to the transport direction A or B.

In the embodiments of FIGS. 5 and 6, the motion of the printing head units 5a or 5b and of each of their allocated container receptacles 8 along the printing section 7 occurs such that that the container receptacle 8 located at the printing section infeed 7.1 (pivoting area) is mechanically registered by a printing head unit 5a, or the printing head unit 5b located at the printing section infeed 7.1 by a container receptacle 8, and then carried along the printing section 7. For this purpose, the linear drive 24 along the printing section 7, for example, is not effective or at most supportive. Of course, even in these embodiments, it is possible to control both linear drives 18 and 24 in their section allocated to the printing section 7 by means of the control unit 16 such that, by means of this control alone, the synchronous motion between each container receptacle 8 and the allocated printing head unit 5a results along the printing section 7.

The invention was described above, using execution examples. It is understood that changes and modifications are possible without departing from the inventive idea underlying the invention. Thus, it was assumed above that the printing section 7 is formed by two parallel, straight sections of the two transport systems 3 and 4. It is understood that these sections of the transport systems 3 and 4, for the printing head units 5, 5a or 5b and the container receptacles 8, can also have a different path, for example a curved path. In principle, it is also possible to design the transport systems for the printing head units and the container receptacles such that these elements move along the printing section 7 not on two separate motion paths offset in the horizontal and/or vertical direction but on a common motion path such that, for example, behind each container receptacle 8 which has reached the printing section infeed 7.1, a printing head unit 5, 5a or 5b is inserted or, vice versa, behind each printing head unit 5, 5a or 5b which has reached the printing section infeed 7.1, a container receptacle 8 is inserted, wherein each of the mutually allocated printing head units 5, 5a or 5b and container receptacles 8 are connected with one another during the motion along the printing section 7 so that then, for example, the printing head units 5, 5a or 5b push or pull the container receptacles 8 not driven along the printing section 7 or, vice versa, the container receptacles 8 push or pull the printing head units 5, 5a or 5b not driven along the printing section 7.

The connection, as regards drives, between the printing head units and container receptacles can, in turn, be achieved in many different ways, for example through mechanical coupling elements, through magnetic coupling etc.

Above, it was assumed that the two transport systems 3 and 4 each have, for the motion of the printing head units 5, 5a or 5b or of the container receptacles 8, an electric linear drive directly acting on the carriages 9, 9a, 9b or 23. Of course, other drives are also possible, for example drives having transport belts or conveyor belts but, in each case, preferably those enabling, on different sections of the transport sections or motion paths, different motion conditions for the printing head units 5, 5a or 5b and/or container receptacles 8 but ensuring, on the printing section 7, a synchronous motion between the container receptacles 8 and the printing head units 5, 5a or 5b allocated to these. It is further possible to design only one transport system, for example the transport system 3 for the printing head units 5, 5a or 5b or the transport system 4 for the container receptacles 8 as a transport system of such flexibility and the other transport system for the container receptacles 8 or printing head units 5, 5a or 5b as a rigid transport system.

REFERENCE LIST 1, 1a, 1b device for printing containers
2 container
2.1 container bottom
2.2 container closure
3, 4 transport system
5, 5a, 5b printing head unit
6 motion path
6.1-6.4 sections of the motion path 6
7 printing section
7.1 printing section infeed (pivoting area)
7.2 printing section outfeed
8 container receptacle
9, 9a, 9b carriages
10 printing unit 11 printing head
12 supply and control unit
13 auxiliary tank
14 pump
15 electronics
16 central control unit
17 data transmission section
18 linear drive
19 beam
20 data transmission section
21 filling station
22 data transmission section
23 carriage
24 linear drive
24.1 data transmission section
25 beam
26 support foot
26.1, 26.2 leg
27 turntable
28 jib
29 lifting and rotating drive
29.1 shaft of the lifting and rotating drive
30 data transmission section
31 centring bell
32 container infeed
33 container outfeed
A, B transport direction
C stroke of the centring bell 31
D pivoting or rotary motion of the centring bell 31
VA axis

The invention claimed is:

1. An apparatus for printing containers in several colors on an outer container surface with an imprint formed by a print image, wherein said apparatus comprises a plurality of printing head units, wherein said apparatus further comprises a first transport system, wherein said apparatus further comprises a plurality of container receptacles, and wherein said apparatus further comprises a second transport system, wherein each printing head unit from said plurality of printing head units comprises a printing unit, wherein said printing unit comprises at least two printing heads for producing said print image, wherein said first transport system moves said printing head units along a first transport direction on a first closed motion path, wherein said second transport system moves said container receptacles along a second transport direction on a second closed motion path, wherein said second closed motion path extends between a container feed, which receives a container to be printed, and a container discharge, which discharges a printed container, wherein said first transport system and said second transport system form a printing section between said container feed and said container discharge within which occurs printing of each container received in a container receptacle by a printing head unit allocated to said container receptacle or a printing unit thereof, wherein said first transport system is configured for synchronously carrying said printing head units with respective allocated container receptacles of said second transport system along said printing section, wherein at least one of said first and second transport systems is configured for causing controlled motion of at least one of said printing head units and said container receptacles along a motion path thereof, wherein said controlled motion, relative to a respective main motion direction, is independent, in at least one of motion type and speed, of at least one of other printing head units of said at least one of the transport systems and container receptacles of said at least one of the transport systems, wherein a selected transporter is a member of a set that consists of said first transport system and said second transport system, wherein, in a first case, said selected transporter is said first transport system, wherein, in a second case, said selected transporter is said second transport system, wherein, in said first case, said first and second moved articles are printing head units from said plurality of printing head units, wherein, in said second case, said first and second moved articles are container receptacles from said plurality of container receptacles, wherein said selected transporter is configured to cause said first moved article to undergo a first motion along a motion path that is associated with said selected transporter, wherein said selected transporter is configured to cause said second moved article to undergo a second motion along said motion path that is associated with said selected transporter, wherein said first motion is characterized by at least one of motion type and speed, wherein said second motion is characterized by at least one of motion type and speed, wherein, for at least a part of said motion path that is associated with said selected transporter, said first motion, which is undergone by said first article, differs from said second motion, which is undergone by said second article, and wherein at least one of said printing head units and carriages thereof and container receptacles and carriages thereof comprises a drive-related coupling of container receptacles with allocated printing head units on said printing section.

2. The apparatus of claim 1, wherein said first transport system comprises individually movable carriages, each of which forms a printing head unit with said printing unit.

3. The apparatus of claim 1, wherein said printing heads are ink-jet printing heads, wherein each of said printing-heads is configured to receive, from a corresponding supply-and-control unit, one of printing color and printing ink, wherein each of said printing-head units is configured for selecting ink-jet printing heads, and wherein electronics of said supply-and-control unit are configured for electronic storage of one of a printing template that corresponds to said print image and a printing mask that corresponds to said print image.

4. The apparatus of claim 1, wherein said second transport system comprises a plurality of second carriages each of which is part of one of said container receptacles.

5. The apparatus of claim 1, wherein said container receptacles comprise means for at least one of clamping and holding containers.

6. The apparatus of claim 1, wherein said first transport system comprises a linear drive for moving said printing head units, wherein said linear drive is a constituent of said first transport element, wherein said linear drive is not a constituent of a printing head unit, wherein said printing head units comprise a first printing head unit and a second printing head unit, wherein said linear drive moves said first printing head unit along said first transport direction, wherein said linear drive moves said second printing head unit along said first transport direction, wherein said linear drive moves said first printing head unit with a first velocity, wherein said linear drive moves said second printing head with a second velocity, and wherein said first velocity differs from said second velocity.

7. The apparatus of claim 6, wherein said linear drive comprises an electric linear motor system.

8. The apparatus of claim 7, wherein said linear motor system comprises a plurality of successive magnetic poles.

9. The apparatus of claim 6, wherein said linear drive comprises mechanical conveying elements.

10. The apparatus of claim 9, wherein said mechanical conveying elements comprise at least one of a transport belt and a conveyor belt.

11. The apparatus of claim 1, wherein said drive-related coupling comprises mechanical coupling elements.

12. The apparatus of claim 1, wherein said drive-related coupling comprises magnetic coupling elements.

13. The apparatus of claim 1, wherein said container receptacle is moved by an allocated printing head unit by one of pulling and pushing along said printing section.

14. The apparatus of claim 1, wherein said allocated printing unit is moved by said container receptacle by one of pushing and pulling along said printing section.

15. The apparatus of claim 1, wherein said first transport system and said second transport section form, at said printing section, a common motion path section for said printing head unit and said container receptacles.

16. The apparatus of claim 1, further comprising, at said first transport system or at a local motion path of said printing head units, at least one of a refilling station and filling station for refilling said printing head units with printing color.

17. The apparatus of claim 1, wherein said container receptacles comprise means for at least one of controlled rotation of containers and controlled pivoting of containers during printing.

18. The apparatus of claim 1, wherein said second transport system comprises a linear drive for moving at least one of said container receptacles and carriages thereof.

19. An apparatus for printing containers in several colors on an outer container surface with an imprint formed by a print image, said apparatus comprising a plurality of printing head units, each of which comprises a printing unit, said printing unit comprising at least two printing heads for producing said print image, a first transport system for moving said printing head units along a first transport direction on a first closed motion path, a plurality of container receptacles, a second transport system for moving said container receptacles along a second transport direction on a second closed motion path, wherein said second closed motion path extends between a container feed, which receives a container to be printed, and a container discharge, which discharges a printed container, wherein said first transport system and said second transport system form a printing section between said container feed and said container discharge within which occurs printing of each container received in a container receptacle by a printing head unit allocated to said container receptacle or a printing unit thereof, wherein said first transport system is configured for synchronously carrying said printing head units with respective allocated container receptacles of said second transport system along said printing section, wherein at least one of said first and second transport systems is configured for causing controlled motion of at least one of said printing head units and said container receptacles along a motion path thereof, said controlled motion, relative to a respective main motion direction, being independent, in at least one of motion type and speed, of at least one of other printing head units of said at least one of the transport systems and container receptacles of said at least one of the transport systems, wherein one or both of said transport systems comprises a linear drive for moving said printing head units, wherein said linear drive is not a constituent of a printing head unit, wherein said printing head units comprise a first printing head unit and a second printing head unit, wherein said linear drive moves said first printing head unit along said first transport direction, wherein said linear drive moves said second printing head unit along said first transport direction, wherein said linear drive moves said first printing head unit with a first velocity, wherein said linear drive moves said second printing head with a second velocity, wherein said first velocity differs from said second velocity, wherein said linear drive comprises an electric linear motor system, and wherein at least one of said printing head units and carriages thereof and container receptacles and carriages thereof comprises a drive-related coupling of container receptacles with allocated printing head units on said printing section.

20. The apparatus claim 19, further comprising carriages for said printing head units, a carriage guide, a machine frame, a first beam, and a second beam, wherein said first beam and said second beam cooperate to hold said linear drive on said machine frame to form said carriage guide, where said linear motor system comprises a plurality of successive magnetic poles along the motion path, and a corresponding plurality of electric windings that are associated with said magnetic poles, and permanent magnets at said carriages of said printing head units.

\* \* \* \* \*